(12) United States Patent
Wissemborski et al.

(10) Patent No.: US 9,080,028 B2
(45) Date of Patent: Jul. 14, 2015

(54) COMPOSITION WITH ACID-ACTIVATABLE METAL COMPONENT

(75) Inventors: Rüdiger Wissemborski, Gau-Algesheim (DE); Rainer Schnee, Mainz (DE); Gideon Rath, Darmstadt (DE); David Kümmet, Budenheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 195 days.

(21) Appl. No.: 13/808,272

(22) PCT Filed: Jul. 11, 2011

(86) PCT No.: PCT/EP2011/061749
§ 371 (c)(1),
(2), (4) Date: Mar. 14, 2013

(87) PCT Pub. No.: WO2012/007422
PCT Pub. Date: Jan. 19, 2012

(65) Prior Publication Data
US 2013/0165559 A1    Jun. 27, 2013

(30) Foreign Application Priority Data
Jul. 14, 2010    (DE) .......................... 10 2010 031 347

(51) Int. Cl.
*C08K 3/08* (2006.01)
*C08K 5/00* (2006.01)
*C08K 3/00* (2006.01)
*C08J 3/22* (2006.01)

(52) U.S. Cl.
CPC ................. *C08K 5/0008* (2013.01); *C08J 3/22* (2013.01); *C08K 3/0041* (2013.01); *C08J 2400/00* (2013.01); *C08K 2201/012* (2013.01)

(58) Field of Classification Search
USPC .................................. 523/351; 524/127, 440
See application file for complete search history.

(56) References Cited

U.S. PATENT DOCUMENTS

| | | |
|---|---|---|
| 5,153,038 A | 10/1992 | Koyama et al. |
| 6,899,822 B2 | 5/2005 | McKedy |
| 2002/0086929 A1 | 7/2002 | Chiang et al. |

FOREIGN PATENT DOCUMENTS

| | | |
|---|---|---|
| EP | 0 370 802 | 5/1990 |
| EP | 1 640 408 | 3/2006 |
| WO | 96/40412 | 12/1996 |
| WO | 2008/008715 | 1/2008 |

*Primary Examiner* — Edward Cain
(74) *Attorney, Agent, or Firm* — Drinker Biddle & Reath LLP

(57) ABSTRACT

A composition which includes a plastic matrix, an acid-activatable metal component selected from aluminium (Al), magnesium (Mg), zinc (Zn), copper (Cu), iron (Fe), tin (Sn), cobalt (Co) and manganese (Mn); and at least one acid carrier which in the RoO test has a rate of oxidation (RoO=rate of oxidation) of less than 1000 ppm of iron with a reaction time of 60 min.

13 Claims, No Drawings

COMPOSITION WITH ACID-ACTIVATABLE METAL COMPONENT

CROSS REFERENCE TO RELATED APPLICATIONS

This application is a National Stage of International Application No. PCT/EP2011/061749 filed Jul. 11, 2011, which claims benefit of German Patent Application No. 10 2010 031 347.5 filed Jul. 14, 2010, both of which are herein incorporated by reference in their entirety.

SUBJECT-MATTER OF THE INVENTION

The invention concerns a composition which includes a plastic matrix, an acid-activatable metal component selected from aluminium (Al), magnesium (Mg), zinc (Zn), copper (Cu), iron (Fe), tin (Sn), cobalt (Co) and manganese (Mn) and at least one acid carrier.

BACKGROUND OF THE INVENTION

Products packaged in plastic materials but also the packaging materials of plastic themselves are exposed to contact with oxygen in the air, whereby the packaged products but also the packagings are broken down, spoil or detrimentally change in some other way. In the case of foodstuffs there is at best only discoloration due to oxidation reactions, but frequently also there is a faster loss of taste, breakdown of nutritionally relevant substances and growth of micro-organisms and thus the occurrence of substances which are damaging to health such as mould fungi and toxins. Packaged drugs can lose their effect under the influence of oxygen due to oxidative breakdown more quickly than desired and also can lose their original form of administration by virtue of decay reactions. Packaging materials themselves can change in colour or become cloudy or porous under the influence of oxidative breakdown or decay reactions and can lose their sealing integrity so that the packaged products lose their protection due to the packaging material and are exposed to the environmental influences.

Known measures for protecting products or packagings from attack by oxygen in the air include for example the use of composite films as packaging materials, oxygen-resistant coatings on the packaging material, packaging products in a protective gas such as nitrogen and/or carbon dioxide, using antimicrobial substances and preserving substances for preventing the growth of micro-organisms, and the use of oxygen consuming materials as packaging materials.

Oxygen-consuming packaging materials are known in the state of the art. The principle is based on the fact that the packaging material contains an oxidisable substance with which the oxygen in the air can react without the material itself being damaged thereby and the bound oxygen in the air can also no longer react with the packaged products. For example the use of reduced iron powder as an oxygen-consuming material which is embedded in a plastic packaging material is known. The iron reacts with oxygen, with the formation of oxides. An overview of the state of the art in that field is to be found in WO-A-9640412 which itself discloses an oxygen-consuming composition with an oxidisable metal component, an electrolyte component and a non-electrolytic acid component. The acid component serves for activation of the metal in a redox reaction, with formation of metal cations and hydrogen gas from the acid protons. The metal cations can then bind free oxygen, with oxide formation.

One disadvantage and problem with the known oxygen-consuming systems with metal and activating acid is that reaction of the activation of the metal frequently occurs at a very early moment in time, for example already occurring in production of the plastic material or upon transport or storage thereof, before it is used at all for packaging foodstuffs or other products, where the oxygen-consuming effect is first required. A further disadvantage of known systems is that the oxygen-consuming effect is used up early and does not persist for sufficiently long.

PROBLEM

The problem of the present invention is therefore that of providing a composition suitable for example as a packaging material having a plastic matrix having oxygen-consuming properties, and improving that composition such that those oxygen-consuming properties are activated later than in the case of known compositions and/or are maintained for longer.

DESCRIPTION OF THE INVENTION

The problem according to the invention is solved by a composition which includes a plastic matrix, an acid-activatable metal component selected from aluminium (Al), magnesium (Mg), zinc (Zn), copper (Cu), iron (Fe), tin (Sn), cobalt (Co) and manganese (Mn) and at least one acid carrier which in the RoO test has an oxidation rate (RoO=rate of oxidation) of less than 1000 ppm of iron with a reaction time of 60 min, wherein the RoO is defined as described in the description hereinafter under RoO (rate of oxidation).

RoO (Rate of Oxidation)

The RoO is a measurement of the capability of an acid carrier or a combination of acid carriers to oxidise elementary iron. The RoO test is defined as follows, in accordance with the present application:

100 g of water (distilled $H_2O$) are weighed into a glass beaker, the glass beaker is covered with a clock glass and the water is heated with agitation to 50° C. When that temperature is reached 1 g of elementary iron powder (product ABC100.30 from Hoganas AB, Sweden) and 4 g of the acid carrier or the combination of acid carriers are added. After a given reaction time (10 min, 30 min and/or 60 min) the beaker is removed from the heating plate and the solution decanted off or filtered to separate unreacted elementary iron from the solution. The content of dissolved iron in the solution is determined by means of atomic absorption spectroscopy (AAS) and/or atomic emission spectroscopy (AES, OES) and specified in ppm of iron.

The present invention provides that the protective properties of oxygen-consuming compositions in plastic materials can be markedly improved. For that purpose it is important that the acid carrier used or the combination of acid carriers used fulfils the demands according to the invention on the rate of oxidation (RoR). It was surprisingly possible with the invention to provide that the oxygen-consuming effect does not already start prematurely in production and/or upon transport or storage and is thus also prematurely used up. Furthermore the choice according to the invention of the acid carrier or the combinations of acid carriers which satisfy the criteria according to the invention of the rate of oxidation (RoR) make it possible to achieve an oxygen-consuming effectiveness which persists longer than known systems.

When in the context of the present invention reference is made to an acid-activatable metal component selected from the above-mentioned elements, that is also intended in accordance with this invention to embrace combinations of the specified elements or acid-activatable metal components insofar as that is technically feasible and meaningful. Likewise, when reference is made to an acid carrier in this application in connection with the present invention that is also always intended to embrace a combination of a plurality of acid carriers insofar as that is technically feasible and meaningful.

In a preferred embodiment of the invention the acid carrier in the RoO test has a rate of oxidation (RoO) of less than 900 ppm of iron or less than 800 ppm of iron or less than 700 ppm of iron or less than 600 ppm of iron with a reaction time of 60 min.

In a further preferred embodiment of the invention the acid carrier in the RoO test has a rate of oxidation (RoO) of less than 600 ppm of iron, preferably less than 400 ppm of iron with a reaction time of 30 min. At the same time or alternatively the acid carrier in the RoO test has a rate of oxidation of less than 300 ppm of iron, preferably less than 200 ppm of iron with a reaction time of 10 min.

The acid carrier of the present invention can be any acid which satisfies the demands according to the invention on the rate of oxidation (RoR). It should be capable of activating or oxidising the metal component used. Preferably the acid carrier according to the invention is selected from salts of phosphorus-bearing oxoanions, particularly preferably from phosphates, condensed phosphates, phosphonates, phosphites, mixed hydroxide phosphates, cyanurates and mixtures of the aforementioned compounds.

Examples of acid carriers particularly suitable according to the invention include modified acid sodium pyrophosphate (SAPP, modified to reduce the RoO in relation to pure SAPP), dicalcium phosphate dihydrate (DCPD), sodium aluminium sulphate (SAS), sodium aluminium phosphate (SALP), potassium aluminium phosphate (PALP), calcium magnesium aluminium phosphate, calcium polyphosphate, magnesium polyphosphate, calcium pyrophosphate, magnesium pyrophosphate and mixtures of the aforementioned compounds.

Not all of the aforementioned phosphate compounds satisfy the demand according to the invention on the rate of oxidation (RoO) as acid carriers in their pure form. They can then be used in modified form. Such modifications for reducing the reaction speed of acid carriers are basically known to the man skilled in the art from the state of the art. Corresponding products with a delayed reaction time are also commercially available. For example, modifications, which react to differing degrees, of acid sodium pyrophosphate (SAPP) are commercially available, which are modified for example in respect of their rate of reaction by the addition of various metal ions (Al, K, Ca and so forth). The precise mechanisms which lead to the delayed rate of reaction are however not known or completely understood in every case in relation to the modified acid carriers.

In a further embodiment of the invention the composition contains the metal component in an amount of 0.1 to 70%, preferably 5 to 40% by weight, with respect to the total weight of the composition.

In still a further embodiment of the invention the composition contains the acid carrier in an amount of 0.1 to 70% by weight, preferably 5 to 40% by weight, with respect to the total weight of the composition.

In a further embodiment of the invention the composition has at least two acid carriers of which a first of the acid carriers in the RoO test has a rate of oxidation (RoO) of less than 1000 ppm of iron or less than 900 ppm of iron or less than 800 ppm of iron or less than 700 ppm of iron or less than 600 ppm of iron with a reaction time of 60 min, and of which a further one of the acid carriers in the RoO test has a rate of oxidation (RoO) which is above the rate of oxidation of the first acid carrier by at least 200 ppm of iron or by at least 300 ppm of iron or by at least 400 ppm of iron or by at least 500 ppm of iron or by at least 600 ppm of iron with a reaction time of 60 min.

The aforementioned combination comprising a first acid carrier with the rate of oxidation which is limited according to the invention and a further acid carrier with a definedly higher rate of oxidation than the first acid carrier is also referred to as a double-acting system. That system with a faster reacting and a slower reacting acid carrier unites various advantages.

The acid carrier with the higher rate of oxidation imparts to the system an increased initial activation in order for example to consume at an early time as much as possible of an oxygen contained in a packaging. The further acid carrier with the lower rate of oxidation provides for later and weaker activation of a further part of the metal component and thus for an effectiveness which persists for a longer time for the composition. That combination in a double-acting system has proven to be particularly advantageous in the sense of high and long-lasting protection of products and packaging materials.

Particularly preferably the acid-activatable metal component is or includes iron (Fe).

Besides the choice of acid-activatable metal component and acid carrier or carriers the properties of the composition can also be influenced by further additives. In embodiments of the invention the composition contains for example one or more separation means for preventing or delaying the premature reaction between the metal component and the acid carrier. The separation means is preferably selected from cereal starch such as for example maize starch, rice starch or wheat starch, modified flours, silicon dioxide such as for example pyrogenic silicic acid, hydrophobic silicic acid or hydrophilic silicic acid, tricalcium phosphates, calcium carbonate, calcium sulphate, silanes, fats and mixtures of the aforementioned. The reaction rate in the plastic matrix can also be influenced by the addition of the separation means.

Preferably thermoplastic polymers are used as the plastic matrix for the composition according to the invention. Examples of suitable thermoplastic polymers are polyolefins such as polyethylene, polypropylene, polybutylene, polymethylpentene and block, graft and copolymers thereof, styrene polymers such as standard polystyrene, impact-resistant polystyrene, styrene acrylonitrile, acrylonitrile butadiene styrene, acrylonitrile styrene, acrylic rubber, halogen-bearing vinyl polymers such as polyvinyl chloride, polyvinylidene chloride, polyvinyl fluoride, tetrafluoromethylene hexafluoromethylene copolymer, ethylene tetrafluoroethylene copolymer, polychlorotrifluoro ethylene, ethylene chlorotrifluoro ethylene copolymer, acrylic polymers, polyacrylate, polymethacrylate, polyacetate such as polyoxymethylene, linear polycondensates such as polyamide (PA-6, PA-66, PA-610, PA-612, PA-11, PA-12 etc), polycarbonates, polyesters (for example polyethylene terephthalate, polybutylene terephthalate etc), polyimides, polyaryl ketones, polysulphones, polyurethanes, polyphenylenes, polymers of unsaturated alcohols and amines or acyl derivatives or acetals thereof such as polyvinyl alcohol, polyvinyl acetates, polyvinyl butyral, polyvinyl benzoate, cross-linked polycondensates and polyadducts, such as phenoplasts, aminoplasts, epoxy resins, unsaturated polyesters, polyurethane, modified natural substances such as cellulose ester, including copolymers or mixtures of the aforementioned polymers.

The invention further concerns an additive composition for introduction into a plastic matrix, which includes an acid-activatable metal component selected from aluminium (Al), magnesium (Mg), zinc (Zn), copper (Cu), iron (Fe), tin (Sn), cobalt (Co) and manganese (Mn) and at least one acid carrier in accordance with the foregoing description and the claims.

Preferably the additive composition contains the metal component and the acid carrier or carriers in a weight ratio of 1:10 to 10:1, particularly preferably 1:2 to 2:1 and possibly further additives.

The additive composition according to the invention can advantageously be present in powder form or embedded in a plastic matrix in granulate form, for example in the form of a so-called masterbatch. The term masterbatch is used to denote additive composition embedded in a plastic matrix, in the form of granules or powders, in which the additive composition is present in content levels which are higher than in the end application. They are added to the plastic (raw polymer) for changing the properties thereof. Masterbatches have the advantage over the addition of various substances in the form of pastes, powders or liquids, that they ensure a high degree of process reliability and are very good to work with. In the case of a masterbatch the attempt is generally made to concentrate the additive as much as possible, that is to say to use as little plastic matrix material as possible to embed the additive or additives. To produce a masterbatch the additives, for example also colour pigments, are mixed with raw polymer, that is to say untreated plastic granules. The mixture is then melted in an extruder and then granulated. Alternatively the components can also be mixed directly by way of different metering weighing devices in the extruder and melted. A masterbatch permits simple handling by virtue of good meterability.

Finally the invention also includes the use of an additive composition in accordance with the foregoing description and the claims as oxygen-consuming constituent in plastic parts of all kinds, preferably in packagings, foodstuff packagings, films, etc. The use of the composition according to the invention in foodstuff packagings is particularly preferred as in them the oxygen-consuming properties of the compositions according to the invention are particularly useful.

The invention claimed is:

1. A composition which includes a plastic matrix, an acid-activatable metal component selected from the group consisting of aluminium (Al), magnesium (Mg), zinc (Zn), copper (Cu), iron (Fe), tin (Sn), cobalt (Co) and manganese (Mn); and at least one acid carrier which in the RoO test has a rate of oxidation (RoO=rate of oxidation) of less than 900 ppm of iron with a reaction time of 60 min.

2. The composition according to claim 1, wherein the acid carrier in the RoO test has a rate of oxidation (RoO) of less than 600 ppm of iron with a reaction time of 30 min and/or of less than 300 ppm of iron with a reaction time of 10 min.

3. The composition according to claim 1, wherein the acid carrier is selected from salts of phosphorus-bearing oxoanions.

4. The composition according to claim 1, wherein the acid carrier is selected from the group consisting of modified acid sodium pyrophosphate (SAPP, modified to reduce the RoO in relation to pure SAPP), dicalcium phosphate dihydrate (DCPD), sodium aluminium sulphate (SAS), sodium aluminium phosphate (SALP), potassium aluminium phosphate (PALP), calcium magnesium aluminium phosphate, calcium polyphosphate, magnesium polyphosphate, calcium pyrophosphate, magnesium pyrophosphate and mixtures of the aforementioned compounds.

5. The composition according to claim 1, wherein the composition contains the metal component in an amount of 0.1 to 70% by weight with respect to the total weight of the composition, and/or contains the acid carrier in an amount of 0.1 to 70% by weight with respect to the total weight of the composition.

6. The composition according to claim 1, wherein the composition has at least two acid carriers of which a first of the acid carriers in the RoO test has a rate of oxidation (RoO) of less than 1000 ppm of iron with a reaction time of 60 min, and of which a further one of the acid carriers in the RoO test has a rate of oxidation (RoO) which is above the rate of oxidation of the first acid carrier by at least 200 ppm of iron with a reaction time of 60 min.

7. The composition according to claim 1, wherein the plastic matrix is a thermoplastic material.

8. The composition according to claim 1, wherein the acid-activatable metal component is or includes iron (Fe).

9. An additive composition for introduction into a plastic matrix which includes an acid-activatable metal component selected from the group consisting of aluminium (Al), magnesium (Mg), zinc (Zn), copper (Cu), iron (Fe), tin (Sn), cobalt (Co) and manganese (Mn); and at least one acid carrier, which in the RoO test has a rate of oxidation (RoO=rate of oxidation) of less than 900 ppm of iron with a reaction time of 60 min.

10. The additive composition according to claim 9 which contains the metal component and the acid carrier or carriers in a weight ratio of 1:10 to 10:1, and possibly further additives.

11. The additive composition according to claim 9 is in powder form or embedded in a plastic matrix in granule form (masterbatch).

12. A method of using the additive composition according to claim 9 as an oxygen-consuming constituent in plastic parts comprising adding the additive composition to the plastic parts.

13. The composition according to claim 3, wherein the acid carrier is selected from the group consisting of phosphates, condensed phosphates, phosphonates, phosphites, mixed hydroxide phosphates, cyanurates and mixtures of the aforementioned compounds.

* * * * *